United States Patent
Isozaki

(10) Patent No.: US 7,812,061 B2
(45) Date of Patent: Oct. 12, 2010

(54) PROCESS FOR THE PRODUCTION OF RECYCLED POLYCARBONATE AS RAW MATERIAL FOR FLAME-RETARDANT RESIN COMPOSITIONS AND POLYCARBONATE-BASE FLAME-RETARDANT RESIN COMPOSITIONS

(75) Inventor: Toshio Isozaki, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 37 days.

(21) Appl. No.: 12/299,335

(22) PCT Filed: May 10, 2007

(86) PCT No.: PCT/JP2007/059684

§ 371 (c)(1),
(2), (4) Date: Nov. 3, 2008

(87) PCT Pub. No.: WO2007/132738

PCT Pub. Date: Nov. 22, 2007

(65) Prior Publication Data

US 2009/0286892 A1    Nov. 19, 2009

(30) Foreign Application Priority Data

May 16, 2006 (JP) .............................. 2006-136696

(51) Int. Cl.
*C08J 11/04* (2006.01)
*C08G 64/00* (2006.01)

(52) U.S. Cl. ...................... 521/40; 359/109; 428/411.1; 428/412; 521/172; 521/173; 524/115; 524/127; 524/140; 524/508; 525/131; 525/148; 525/208; 525/403; 528/196; 528/198; 528/271; 528/272; 528/500

(58) Field of Classification Search ................. 359/109; 428/411.1, 412; 521/40, 172, 173; 524/115, 524/127, 140, 508; 525/131, 148, 208, 403; 528/196, 198, 271, 272, 500

See application file for complete search history.

(56) References Cited

U.S. PATENT DOCUMENTS

| | | | |
|---|---|---|---|
| 2005/0203196 A1 | 9/2005 | Hasegawa et al. | |
| 2005/0261414 A1* | 11/2005 | Mitsuhashi et al. | 524/451 |
| 2007/0179233 A1* | 8/2007 | Isozaki et al. | 524/418 |
| 2009/0170969 A1* | 7/2009 | Ogasawara | 521/40 |

FOREIGN PATENT DOCUMENTS

| | | | |
|---|---|---|---|
| JP | 7 286064 | | 10/1995 |
| JP | 2003 041049 | | 2/2003 |
| JP | 2003 231120 | | 8/2003 |
| JP | 2004 74507 | | 3/2004 |
| JP | 2006 036668 | | 2/2006 |
| JP | 2006-104380 | * | 4/2006 |
| JP | 2006 104380 | | 4/2006 |

* cited by examiner

Primary Examiner—Terressa M Boykin
(74) Attorney, Agent, or Firm—Oblon, Spivak, McClelland, Maier & Neustadt, L.L.P.

(57) ABSTRACT

A method for manufacturing a recycled polycarbonate raw material for a flame retardant resin composition from discarded and/or recovered optical discs using a polycarbonate resin as a substrate material, and includes (a) a step to identify if 2,2-bis(4-hydroxyphenyl)propane as a divalent phenol of the polycarbonate resin raw material is polymerized as the sole raw material in the polycarbonate resin as the substrate material of the discarded and/or recovered optical discs and (b) a step to remove impurities by a chemical treatment by separating only the discarded and/or recovered optical discs, wherein the polycarbonate resin is identified as polymerized by using 2,2-bis(4-hydroxyphenyl)propane as the sole raw material. Accordingly, used optical discs using a PC resin as a substrate material and discarded optical discs as substandard articles in a manufacturing step can be reused as a raw material for a flame retardant polycarbonate resin composition by treating with a method at low cost and a low environmental load.

8 Claims, No Drawings

PROCESS FOR THE PRODUCTION OF RECYCLED POLYCARBONATE AS RAW MATERIAL FOR FLAME-RETARDANT RESIN COMPOSITIONS AND POLYCARBONATE-BASE FLAME-RETARDANT RESIN COMPOSITIONS

The present invention relates to a method for manufacturing a recycled polycarbonate resin raw material for a flame retardant resin composition and a flame retardant polycarbonate resin composition, in more detail, to a method for recycling, as a raw material of the flame retardant resin composition, used optical discs produced by using a polycarbonate resin as a substrate material or discarded optical discs as substandard articles in a manufacturing step and to a flame retardant polycarbonate resin composition using the recycled polycarbonate raw material obtained by the method.

BACKGROUND ART

A polycarbonate resin (hereinafter optionally referred to as PC resin) is excellent in mechanical strength (particularly, impact strength properties), electric properties, transparency and the like and widely used as an engineering plastic in such fields as office automation equipments, electric and electronic fields, automotive fields, construction and building fields and others. Such polycarbonate resin has a high limiting oxygen index among various thermoplastic resins and belongs to a resin generally bearing self-extinguishing properties so that it is utilized in a field demanding a high level of flame retardancy such as office automation equipments, electric and electronic equipments and others.

As described above, the PC resin is widely used in optical materials and the electric and electronic field and others, but difficult to recycle from the optical materials and others to a product with a similar quality including a recovery method so that its reuse is generally limited to cabinets and others. This is due to contamination by impurities and a decrease of a molecular weight by hydrolysis during recovery. Removal of impurities is also difficult and particularly in the case of optical materials, metal film adhesion and contamination by lubricants require a stringent treatment condition in washing and peeling to separate the PC resin, making it difficult to prevent the molecular weight from decreasing without choosing an appropriate condition.

A method to peel with an acid or a base (for example, see Patent Document 1), a mechanochemical method or a grinding method (for example, see Patent Document 2) and a blasting method are well known as a method for recycling and utilizing the PC resin used in CD, MD and the like. However, these methods may allow application of the recycled PC resin to cabinets and others, but are not practiced in recycling to a flame retardant material.

Many techniques are also proposed for a recycling system to supply recycled plastics giving stable quality to the recycled products (for example, see Patent Documents 3 and 4), but every one has a step to separate and recover, a step to crush the discarded optical discs that are separated and recovered and a step to isolate only the PC resin fragments from the crushed PC resin fragments, and in particular, Patent Document 3 is characterized with inclusion of a step to assure their quality, but these processes are not limited to plastic products, but easily known by analogy to a general recycling system existing long before in recycling of used paper, empty cans and the like and also Patent Documents 3 and 4 do not specifically disclose a separating method.

Of course, there is proposed decomposition of a PC resin under a supercritical condition down to a monomer such as 2,2-bis(4-hydroxyphenyl)propane (bisphenol A) and others as a raw material, but polymerization of such monomers to the PC resin again requires a higher cost and increases an environmental load because of higher consumption of energy.

Patent Document 1: Japanese Patent Laid-Open Publication No. H7-286064
Patent Document 2: Japanese Patent No. 323600
Patent Document 3: Japanese Patent Laid-Open Publication No. H2003-231120
Patent Document 4: Japanese Patent Laid-Open Publication No. H2004-74507

DISCLOSURE OF THE INVENTION

Problems to be Solved by the Invention

The present invention has been carried out to address the above circumstances and has an object to provide a method for reusing used optical discs using a PC resin as a substrate material and discarded optical discs as substandard articles in manufacturing steps by treating with a method at low cost and a lower environmental load as a raw material for a flame retardant polycarbonate resin composition.

Means to Solve the Problems

The present inventors have earnestly studied the above problems and found that in the recovered optical discs and discarded optical discs using the PC resin as a substrate material, a flame retardant polycarbonate resin composition with stable physical properties can be obtained when only a polycarbonate obtained by using 2,2-bis(4-hydroxyphenyl)propane (bisphenol A) as the divalent phenol of the PC resin raw material in polymerization is used as a sole raw material, and chemical treatment of such polycarbonate after identifying and separating allows its use as a raw material of the flame retardant polycarbonate resin composition, and thus completing the present invention.

That is, the present invention provides a method for manufacturing the following recycled polycarbonate raw material for a flame retardant resin composition and a flame retardant polycarbonate resin composition.

1. A method for manufacturing a recycled polycarbonate raw material for a flame retardant resin composition from discarded and/or recovered optical discs using a polycarbonate resin as a substrate material, comprising:
    (a) a step to identify if, in the polycarbonate resin as the substrate material of the discarded and/or recovered optical discs, 2,2-bis(4-hydroxyphenyl)propane as a divalent phenol of a raw material of the polycarbonate resin is polymerized as a sole raw material; and
    (b) a step to remove impurities by a chemical treatment by separating only the discarded and/or recovered optical discs, wherein the polycarbonate resin is identified as polymerized by using 2,2-bis(4-hydroxyphenyl)propane as the sole raw material.
2. The method for manufacturing the recycled polycarbonate raw material for the flame retardant resin composition according to 1 above by identifying if, in the polycarbonate resin as the substrate material of the discarded and/or recovered optical discs fed in step (a), 2,2-bis(4-hydroxyphenyl)propane as the divalent phenol of a raw material of the polycarbonate resin is polymerized as the sole raw material by measuring the monomer composition and the fraction of the terminal OH.

3. The method for manufacturing the recycled polycarbonate raw material for the flame retardant resin composition according to 1 or 2 above, wherein the discarded and/or recovered optical discs fed in step (a) are crushed material.
4. The method for manufacturing the recycled polycarbonate raw material for the flame retardant resin composition according to 1 or 2 above, comprising a step to remove a polystyrene dummy substrate contained in the optical discs by passing the discarded and/or recovered optical discs over a polarization plate as a pretreatment step of step (a), wherein the discarded and/or recovered optical discs fed in step (a) are uncrushed material.
5. The method for manufacturing the recycled polycarbonate raw material for the flame retardant resin composition according to 4 above, comprising:

identifying, after the step to remove the polystyrene dummy substrate, if the substrate material resin is obtained by polymerizing 2,2-bis(4-hydroxyphenyl)propane as the sole raw material of the divalent phenol raw material by using information of the optical disc appearance; and identifying, only for optical discs unable to be specified as obtained by polymerizing such sole raw material by using the information of the optical disc appearance, if 2,2-bis(4-hydroxyphenyl)propane as a divalent phenol of a raw material of the polycarbonate resin is polymerized as the sole raw material by measuring the monomer composition and the fraction of the terminal OH in the polycarbonate resin of the substrate material.

6. The method for manufacturing the recycled polycarbonate raw material for the flame retardant resin composition according to any of 1 to 5 above, wherein, before the chemical treatment in step (b), the discarded and/or recovered optical discs are crushed to a size of 0.5 to 3 cm.
7. The method for manufacturing the recycled polycarbonate raw material for the flame retardant resin composition according to any of 1 to 6 above, wherein a residual amount of metals in the recycled polycarbonate raw material obtained by the chemical treatment in step (b) is 1 ppm or less for each of alkali metals, alkaline earth metals and iron type metals and 0.1 ppm or less for each metal other than the above metals.
8. A flame retardant polycarbonate resin composition comprising the recycled polycarbonate raw material obtained by any of methods 1 to 7 above.

Effects of the Invention

According to the present invention, from used optical discs manufactured as a substrate material from a polycarbonate resin with different raw materials and polymerization methods and discarded optical discs as substandard articles in a manufacturing step, by identifying and separating only the discs, of which bisphenol A as a divalent phenol is polymerized as the sole raw material in the polycarbonate resin raw material and by removing impurities with a chemical treatment, the discs can be surely recycled as a raw material for the flame retardant polycarbonate resin composition using a method at low cost and low environmental load.

In the method of the present invention, steps till recycling of the PC resins may be simplified because of separation based on a functional purpose as compared to a conventional separation based on the molecular structure. Thorough separation for recycling also allows effectively achieving a recyclable system for the PC resins, for which recycling was possible only on the premise of degradation.

The flame retardant polycarbonate resin composition obtained according to the present invention is effectively applied to the field, which demands a high level of flame retardancy such as office automation equipments, electric and electronic equipments and others.

BEST MODE FOR CARRYING OUT THE INVENTION

In the method for manufacturing the recycled polycarbonate raw material for the flame retardant resin composition of the present invention, it is first identified in step (a) if, in the polycarbonate resin substrate of the discarded and/or recovered optical discs, the material resin in the substrate is obtained by polymerizing bisphenol A as a sole raw material in the divalent phenol of the polycarbonate raw material. This identification can be performed by determining the monomer composition and the faction of the terminal OH.

Currently commercialized PC resins that are practically used as a substrate material of optical discs include, in addition to (i) a polycarbonate of which bisphenol A alone as a raw material is polymerized, (ii) a polycarbonate of which a monomer other than bisphenol A as a raw material is polymerized, (iii) a mixture in a certain fraction of a polycarbonate of which bisphenol A as a raw material is polymerized and a polycarbonate of which a monomer other than bisphenol A as a raw material is polymerized and (iv) a polycarbonate copolymer of which bisphenol A and other monomer as a raw material are copolymerized, and thus separation of a polycarbonate obtained by polymerizing only bisphenol A as a raw material from these PC resins becomes an effective way for quality assurance when considering their recycling.

In the preset invention, separation and recovery depending on the structure of PC resins with a different chemical structure are a vital technology even the PC resins are similar. Particularly, in application to a flame retardant polycarbonate resin composition, there is a case with improved flame retardancy such as a bisphenol A-polyorganosiloxane copolymer among the cases where a monomer other than bisphenol A is used in the PC resin, but this kind of example is rare and it is not known that PC resins containing a monomer other than bisphenol A generally lowers flame retardancy. The present invention found that, in a method for manufacturing a recycled polycarbonate raw material used as a raw material of the flame retardant polycarbonate resin composition from discarded and/or recovered optical discs using the PC resin as a substrate material, use of only the PC resin manufactured from bisphenol A as the sole raw material in a divalent phenol of the polycarbonate raw material as a recovered raw material for recycling the flame retardant polycarbonate resin composition can provide stable physical properties.

A copolymer may be used as a PC resin for the optical disc to improve flowability so that use of the PC resins used as the substrate of optical discs is likely to lower flame retardancy when used without separation as a raw material of the flame retardant polycarbonate resin composition.

For example, while the limiting oxygen index is 39 in a composition, of which 1000 ppm of an organic alkaline metal salt or organic alkaline earth metal salt is added to the PC resin obtained by polymerizing bisphenol A as a raw material, the limiting oxygen index is 33, in a composition, of which 1000 ppm of an organic alkaline metal salt or organic alkaline earth metal salt is added to the PC resin obtained by copolymerizing bisphenol A with a monomer other than bisphenol A, thus lowering flame retardancy.

The discarded and/or recovered optical discs used in the present invention include recording mediums of CD-ROM, CD-R, CD-RW, DVD-ROM, DVD-R, DVD-RW and the like using the polycarbonate resin as a substrate. Such discarded and/or recovered optical discs may be in a disk-like product form as it is or in a crushed form.

However, it is important that discarded and/or recovered optical discs are treated for every container (lot) containing same grade optical discs generated in the same plants and fabrication plants.

When the discarded and/or recovered optical discs are in a crushed form, an analysis of the monomer composition and a measurement of the fraction of the terminal OH are performed for the PC resin of the substrate material of discarded and/or recovered optical discs in step (a) for each container (lot) containing the same grade discarded and/or recovered optical discs generated in the same plants and fabrication plants to identify if bisphenol A as the divalent phenol of the PC resin raw material is polymerized as the sole raw material. Such determination of the monomer composition and the fraction of the terminal OH can be readily evaluated by the nuclear magnetic resonance spectroscopy ($^1$H-NMR). Other analytical methods also include use of Fourier transform infrared spectroscopy (FT-IR).

For example, as shown in the following examples, when $^1$H-NMR is used to determine the monomer composition and the fraction of the terminal OH of the PC resin and it is found that most of the monomer is bisphenol A and the bisphenol A fraction in the monomer composition is in a range of 94 to 97 mol %, it can be judged that bisphenol A as a divalent phenol of the PC resin raw material is polymerized as the sole raw material.

When the discarded and/or recovered optical disc is in a disk-like product form as it is, a polystyrene dummy substrate to protect the substrate is possibly included in some optical discs so that as a pretreatment in step (a), a step to remove the polystyrene dummy substrate is preferably provided in order to remove such polystyrene dummy substrate. A method to remove the polystyrene dummy substrate includes observing birefringence of the substrate using a polarization plate allowing ready discrimination and addition of the polystyrene dummy substrate removal step can prevent contamination by the polystyrene dummy substrate.

Also, after the removal step of polystyrene dummy substrates, it is preferred to identify if in the substrate material resin, bisphenol A as the divalent phenol is polymerized as the sole raw material by using information of the optical disc appearance, to crush if needed only the resin which cannot be specified as the one obtained by polymerizing bisphenol A as the sole raw material in the divalent phenol raw material, and as described above to identify if bisphenol A as the divalent phenol of the polycarbonate resin raw material is polymerized as the sole raw material by analyzing the monomer composition and determining the fraction of the terminal OH in the PC resin of the optical disc substrate material.

There are also cases where a manufacturer can be specified from the appearance information such as a stamper mark or IFPI code (manufacturer identification code) to identify from the information related to the manufacturer thereof that the polycarbonate resin of the raw material is obtained by polymerizing bisphenol A as the sole raw material.

Identifying in advance using the information of the optical disc appearance is advantageous because of reduction in the number of items used to determine the monomer composition and the fraction of terminal OH in the PC resins of the optical disc substrate material.

In step (b), only the discarded and/or recovered optical discs, of which the polycarbonate resin is identified as obtained by polymerizing only bisphenol A as the sole raw material are separated and chemically treated to remove impurities.

The discarded and/or recovered discs are provided with a heterogeneous layer such as a reflective layer, a protective layer, a recording layer, a printing layer and others on the surface of the polycarbonate substrate and such heterogeneous layers have to be removed because they become impurities when recycled and reused as a raw material for the optical disc. A method to remove such impurities includes a method to remove the heterogeneous layer which could be impurities by a physical treatment or a chemical treatment using a processing agent, but in the present invention, a chemical treatment is used from a viewpoint of work efficiency.

In this chemical treatment, it is preferred to crush the discarded and/or recovered discs to a size (average diameter) of generally 0.5 to 3 cm, preferably 1 to 2 cm in order to remove the heterogeneous layer which could be impurities. As such chemical treatment, for example, use of an alkaline treatment according to Japanese Patent No. 3270037 is preferable.

Prior to the chemical treatment, the crushed recording medium discs are preferably washed in a surfactant in order to remove adhered foreign matter in crushing. The surfactants include non-ionic surfactants, anionic surfactants and cationic surfactants, but non-ionic surfactants and anionic surfactants are preferred. As the non-ionic surfactants, polyethylene glycol ether surfactants, particularly polyethylene glycol ethers of a higher alcohol, polyethylene glycol ethers of an alkyl phenol, and the like are preferred. The anionic surfactants include sodium alkylbenzenesulfonate and the like and are preferably used in combination with the non-ionic surfactants. Concentration of the surfactant is from 0.001 to 10% by mass, preferably 0.01 to 1% by mass.

The above alkali treatment uses an aqueous solution of alkali compounds (hereinafter may be referred to as alkaline aqueous solution) selected from potassium hydroxide, sodium hydroxide, sodium carbonate, potassium carbonate, and the like. The value of pH of the alkaline aqueous solution is preferably 10 to 14. The concentration of the alkaline aqueous solution is preferably 0.1 to 20% by mass, more preferably 0.1 to 10% by mass. A washing temperature of the alkaline aqueous solution is preferably 105 to 130° C. A processing time varies with the processing temperature, but is generally preferably from 15 to 60 minutes.

After such alkali treatment, the substrate is preferably washed in an aqueous mixture of the surfactant and a peroxide. Washing of the substrate with the surfactant is useful to remove pigments and very fine foreign matters, which are reattached to the substrate after released into the alkaline aqueous solution. As the surfactant, the one similar to the above can be used and similar concentration to the above can also used.

A peroxide includes an oxide having an —O—O— bond and a metal peroxide bearing a multivalent metal and preferably hydrogen peroxide, salts thereof, persulfuric acid and salts thereof. The concentration of a peroxide aqueous solution is preferably 0.1 to 10% by mass. A temperature of the peroxide aqueous solution is also preferably 65 to 95° C., more preferably 80 to 90° C. A processing time varies with the processing temperature, but is generally preferably from 15 to 60 minutes. The peroxide is useful for complete removal of the residual metals and dyes.

When the recycled polycarbonate raw material of the present invention is reused as the flame retardant resin composition in the office automation equipments, electric and electronic equipments, and the like, a residual amount of the metals is preferably 1 ppm or less for the alkali metals, alkaline earth metals and iron type metals and 0.1 ppm or less for heavy metals other than these metals.

By performing the chemical treatment as described above, it is possible to reduce the alkaline metals, alkaline earth metals and iron type metals to 1 ppm or less, which are likely to be originally contained in the recycled PC resin, solvents and containers used in the chemical treatment or the PC resin in the recovered optical discs. In addition to these metals, it is also possible to reduce a residual amount of such metals to 0.1 ppm or less as metals like Au, Ag, Al, and the like used for the optical disc reflection layer, heavy metals like Te, Sb, and the like derived from the recording layer of the magneto-optical discs or phase change optical discs and metals like as Cu, and the like derived from an organic pigment used in the rewritable optical discs such as CD-R and DVD-R.

For example, when reused for the optical discs, in particular, exceeding the residual amount of the alkaline metals, alkaline earth metals and iron type metals above 1 ppm, the PC resin is hydrolyzed depending on a preserved environment of the optical discs, possibly causing decrease of the long term reliability such as inability to read the recorded data.

In addition, an aqueous hydrogen peroxide solution between 0.1 to 10% by mass has pH of 2 to 5 (weakly acidic) and can be preferably used as a final washing fluid.

The recycled polycarbonate raw material thus obtained is blended with a given amount of a new polycarbonate resin to adjust to a desired molecular weight and subsequently kneaded if needed to allow its use as a raw material for the flame retardant resin composition. In this kneading, stabilizers, mold release agents and others are added if needed. Such recycled polycarbonate raw material can be used as a raw material of the flame retardant resin composition similarly to a general polycarbonate raw material.

EXAMPLES

The present invention is further specifically described according to the examples below, but not limited in any way by these examples.

In the following examples, measurement of the monomer composition and the fraction of the terminal OH in the PC resin of the substrate material for the optical discs were performed as follows.

<Measurement Conditions with NMR Instrument>

A 45 mg sample of the PC resin was taken in an NMR sample tube 5 mm in diameter, to which 0.4 ml of deuterochloroform was added to homogeneously dissolve the sample and a $^1$H-NMR spectrum was measured using a 500 MHz NMR instrument (JNM-LAMBDA500 manufactured by JEOL Ltd.)

<Measurement of the Fraction of Terminal Hydroxyl Groups>

Setting the peak top of tetramethylsilane at 0 ppm in a $^1$H-NMR spectrum, a peak intensity of the aromatic protons in an ortho position to the OH group of bisphenol A observed at 6.68 ppm (a) and a peak intensity due to the methyl protons of p-tert-butyl ether (hereinafter represented by PTBP) group observed at 1.32 ppm (b) were used to calculate the fraction of the terminal OH by the following formula.

$$\text{Fraction of the terminal OH (mol \%)} = [(a/2)/(a/2+b/9)] \times 100$$

<Measurement of the Monomer Composition>

Setting the peak top of tetramethylsilane at 0 ppm in a $^1$H-NMR spectrum, a peak intensity of the aromatic protons of bisphenol A and PTBP observed at 7.21 ppm (c), a peak intensity of the aromatic protons in an ortho position to the OH group of bisphenol A observed at 6.68 ppm (a) and a peak intensity due to the methyl protons of PTBP observed at 32 ppm (b) were used to calculate the monomer composition by the following formula.

$$\text{Bisphenol A (mol \%)} = \{[(a+c)/8]/\{[(a+c)/8]+(b/9)\}\} \times 100$$

$$\text{PTBP (mol \%)} = [(b/9)/\{[(a+c)/8]+(b/9)\}] \times 100$$

Evaluation of the flame retardancy was performed as follows.
(1) Limiting oxygen index: complying with JIS K 7201
(2) Flame retardancy test: complying with UL94

Example 1

Disk-like optical discs weighing roughly 100 kg, of which aluminum as a heterogeneous layer was laminated on a polycarbonate substrate of the optical discs that are outside the product specification and recovered from an optical disc manufacturing equipment were brought in by a container. In order to remove the polystyrene dummy substrate from these optical discs, a polarization plate was used to observe birefringence and 265 sheets of polystyrene dummy substrates showing iridescent appearance were removed.

$^1$H-NMR analysis of the substrate portion of one disk-like optical disc described above was then performed to determine a divalent phenol monomer composition and the fraction of the terminal hydroxyl group of the polycarbonate main chain forming this substrate.

The measured results showed that the fraction of the terminal OH in the recovered optical disc was 5.0 mol % and the monomer composition was 94.5 mol % for bisphenol A and 5.5 mol % for PTBP, respectively. These results confirmed that the PC resin of the recovered disc substrate is obtained by polymerizing bisphenol A as the sole raw material of the divalent phenol.

After crushing to a size of 1 to 2 cm, the disk-like optical discs recovered were then treated in an aqueous solution containing 1% by mass of polyoxyethylene distyrenated phenyl ether (Emergen A-500 from Kao Corporation) and 1% by mass of sodium alkylbenzenesulfonate at 90° C. for 60 minutes with stirring. The discs were subsequently treated with 3% by mass of a sodium hydroxide aqueous solution at 120° C. for 30 minutes. The discs were further treated with 5% by mass of a sodium hydroxide aqueous solution at 120° C. for 30 minutes. The discs were subsequently treated with a mixed solution containing the same amount of the similar surfactant to the above and 0.58% by mass equivalent of hydrogen peroxide at 90° C. for 30 minutes. The discs were thoroughly washed with water and then dried at 80° C. for 5 hours to yield the recovered PC resin (hereinafter given by recovered PC1A). The viscosity average molecular weight (Mv) of recovered PC1A was 15,200.

A given amount of such recovered PC1A was placed in a platinum crucible and carbonized in an electric furnace by raising the temperature for complete ashing. A residual amount of metals dissolved in an acid solvent was then determined by an ICP instrument (IRIS Advantage manufactured by JARRELL ASH) to give 0.2 ppm each for Na and Fe and less than 0.1 ppm each for Al, Te, Sb and Cu.

By adding 60 parts by mass of a PC resin (TARFLON FN 2200A from Idemitsu Kosan Co., Ltd.) to 40 parts by mass of the recovered PC1A, a recovered PC resin having a viscosity average molecular weight (Mv) of 19,000 (hereinafter given by recovered PC1B) was obtained. To 100 parts by mass of the recovered PC1B obtained were added 0.3 parts by mass of PTFE (CD076 manufactured by Asahi Fluoropolymer Co., Ltd.), 0.1 part by mass of an organic metal salt compound (Megafac F-114 manufactured by Dainippon Ink and Chemicals Incorporated) and 0.1 part by mass of a stabilizer (Irgfos 168 manufactured by Chiba Specialty Chemicals Co., Ltd.), and the resulting mixture was kneaded and then injection-molded to yield a given number of bars having a size of 3.0 mm×13 mm×127 mm (bar 1A) and bars having a size of 1.5 mm×13 mm×127 mm (bar 1B).

Results of a flame retardancy test showed a limiting oxygen index of 39 (measured with bar 1A) and V-0 in the UL 94 flame retardancy test (measured with bar 1B).

Example 2

To 80 parts by mass of the recovered PC1B obtained in Example 1 were added 10 parts by mass of an ABS resin (AT-05 manufactured by Nippon A & L Inc.), 10 parts by mass of talc (PT-A25 manufactured by Fuji Talc Industrial Co., Ltd.), 0.3 parts by mass of polytetrafluoroethylene (PTFE: CD076 manufactured by Asahi Fluoropolymer Co., Ltd.), 0.1 part by mass of an organic metal salt compound (Megafac F-114 manufactured by Dainippon Ink and Chemicals Incorporated) and 0.1 part by mass of a stabilizer (Irgfos 168 manufactured by Chiba Specialty Chemicals Co., Ltd.), and the resulting mixture was kneaded and then injection-molded to yield a given number of bars having a size of 3.0 mm×13 mm×127 mm (bar 1A) and bars having a size of 1.5 mm×13 mm×127 mm (bar 1B).

Results of the flame retardancy test showed a limiting oxygen index of 36 (measured with bar 1A) and V-0 in the UL 94 flame retardancy test (measured with bar 1B).

Comparative Example 1

In Example 1, 60 parts by mass of the PC resin (TARFLON FN2200A manufactured by Idemitsu Kosan Co., Ltd.) were added similarly to Example 1 to 40 parts by mass of a recovered PC resin of a copolymer composed of bisphenol A and 1,1-bis(4-hydroxyphenyl)-3,3,5-trimethylcyclohexane (bisphenol TMC) (hereinafter represented by PC2A, a viscosity average molecular weight (Mv)=14,800) to yield a recovered PC resin having a viscosity average molecular weight (Mv) of 19,000 (hereinafter represented by recovered PC2B). To 100 parts by mass of the recovered PC2B were added 0.3 parts by mass of PTFE (CD076 manufactured by Asahi Fluoropolymer Co., Ltd.), 0.1 part by mass of an organic metal salt compound (Megafac F-114 from Dainippon Ink and Chemicals Incorporated) and 0.1 part by mass of a stabilizer (Irgfos 168 manufactured by Chiba Specialty Chemicals Co., Ltd.), and the resultant mixture was kneaded and then injection-molded to yield a given number of bars having a size of 3.0 mm×13 mm×127 mm (bar 2A) and bars having a size of 1.5 mm×13 mm×127 mm (bar 2B).

Results of the flame retardancy test showed a limiting oxygen index of 33 (measured with bar 2A) and V-T in the UL 94 flame retardancy test (measured with bar 2B).

Comparative Example 2

To 80 parts by mass of the recovered PC2B obtained in Comparative example 1 were added 10 parts by mass of an ABS resin (AT-05 manufactured by Nippon A & L Inc.), 10 parts by mass of talc (PT-A25 manufactured by Fuji Talc Industrial Co. Ltd.), 0.3 parts by mass of PTFE (CD076 manufactured by Asahi Fluoropolymer Co., Ltd.), 0.1 part by mass of an organic metal salt compound (Megafac F-114 manufactured by Dainippon Ink and Chemicals Incorporated) and 0.1 part by mass of a stabilizer (Irgfos 168 manufactured by Chiba Specialty Chemicals Co., Ltd.), and the resultant mixture was kneaded and then injection-molded to yield a given number of bars having a size of 3.0 mm×13 mm×127 mm (bar 1A) and bars having a size of 1.5 mm×13 mm×127 mm (bar 1B).

Results of the flame retardancy test showed a limiting oxygen index of 31 (measured with bar 1A) and V-2 in the UL flame retardancy test (measured with bar 1B) indicating failure.

INDUSTRIAL APPLICABILITY

According to the present invention, used optical discs using a PC resin as a substrate material and discarded optical discs as substandard articles in a manufacturing step can be reused as a raw material for a flame retardant polycarbonate resin composition by treating with a method at low cost and a low environmental load.

The invention claimed is:

1. A method for manufacturing a recycled polycarbonate raw material for a flame retardant resin composition from discarded and/or recovered optical discs, wherein the optical discs comprise a polycarbonate resin in a substrate material, the method comprising:
    (a) identifying, by measuring a monomer composition and a fraction of the terminal OH groups, whether the polycarbonate resin used in the substrate material of the discarded and/or recovered optical discs is manufactured by polymerizing a raw material comprising a divalent phenol, wherein the divalent phenol is only 2,2-bis (4-hydroxyphenyl)propane;
    (b) separating the discarded and/or recovered optical discs in which the polycarbonate resin in the substrate material is manufactured by polymerizing a raw material comprising a divalent phenol, wherein the divalent phenol is only 2,2-bis(4-hydroxyphenyl)propane; and
    (c) removing impurities from the discarded and/or recovered optical discs separated in (b) by an alkaline treatment, thereby obtaining the recycled polycarbonate raw material for a flame retardant resin composition, wherein the impurities are originated in layers other than a substrate.

2. The method for manufacturing the recycled polycarbonate raw material for the flame retardant resin composition according to claim 1, wherein the discarded and/or recovered optical discs are crushed prior to identifying (a).

3. The method for manufacturing the recycled polycarbonate raw material for the flame retardant resin composition according to claim 1, further comprising a removing a polystyrene dummy substrate contained in the discarded and/or recovered optical discs by passing the discarded and/or recovered optical discs over a polarization plate as a pretreatment in (a), wherein the discarded and/or recovered optical discs used in identifying (a) are uncrushed.

4. The method for manufacturing the recycled polycarbonate raw material for the flame retardant resin composition according to claim 3, comprising:
    identifying, after the removing the polystyrene dummy substrate whether the polycarbonate resin used in the substrate material in the optical discs is obtained by polymerizing a raw material comprising a divalent phenol, wherein the divalent phenol is only 2,2-bis(4-hydroxyphenyl)propane, wherein the identifying is conducted by using information of the optical disc appearance; and identifying, only for optical discs unable to be identified by using information of the optical disc appearance, whether the polycarbonate resin used in the substrate material of the unidentified optical discs is obtained by polymerizing a raw material comprising a divalent phenol, wherein the divalent phenol is only 2,2-bis(4-hydroxyphenyl)propane, by measuring a monomer composition and a fraction of the terminal OH groups in the polycarbonate resin of the substrate material.

5. The method for manufacturing the recycled polycarbonate raw material for the flame retardant resin composition according to claim 1, wherein prior to the alkaline treatment, the discarded and/or recovered optical discs are crushed to a size of 0.5 to 3 cm.

6. The method for manufacturing the recycled polycarbonate raw material for the flame retardant resin composition according to claim 1, wherein a residual amount of metals in the recycled polycarbonate raw material after the alkaline treatment is 1 ppm or less for each of alkali metals, alkaline earth metals and iron and 0.1 ppm or less for each metal other than the alkali metals, the alkaline earth metals and iron.

7. A flame retardant polycarbonate resin composition comprising the recycled polycarbonate raw material obtained by the manufacturing method according to claim 1.

8. The method for manufacturing the recycled polycarbonate raw material for the flame retardant resin composition according to claim 1, wherein the layer other than the substrate is at least one selected from the groups consisting of a reflective layer, a protective layer, a recording layer, and a printing layer.

* * * * *